US010916239B2

United States Patent
Park

(10) Patent No.: US 10,916,239 B2
(45) Date of Patent: Feb. 9, 2021

(54) METHOD FOR BEAMFORMING BY USING MAXIMUM LIKELIHOOD ESTIMATION FOR A SPEECH RECOGNITION APPARATUS

(71) Applicant: INDUSTRY-UNIVERSITY COOPERATION FOUNDATION SOGANG UNIVERSITY, Seoul (KR)

(72) Inventor: Hyung Min Park, Seoul (KR)

(73) Assignee: INDUSTRY-UNIVERSITY COOPERATION FOUNDATION SOGANG UNIVERSITY, Seoul (KR)

(*) Notice: Subject to any disclaimer, the term of this patent is extended or adjusted under 35 U.S.C. 154(b) by 140 days.

(21) Appl. No.: 16/223,791

(22) Filed: Dec. 18, 2018

(65) Prior Publication Data

US 2019/0189114 A1    Jun. 20, 2019

(30) Foreign Application Priority Data

Dec. 19, 2017    (KR) ...................... 10-2017- 0175057

(51) Int. Cl.
*G10L 15/14*    (2006.01)
*G10L 21/0208*    (2013.01)
(Continued)

(52) U.S. Cl.
CPC .......... *G10L 15/14* (2013.01); *G10L 21/0208* (2013.01); *H04R 3/005* (2013.01); *G10L 15/00* (2013.01); *G10L 2021/02166* (2013.01)

(58) Field of Classification Search
CPC ..... G10L 15/14; G10L 21/0208; G10L 15/00; G10L 2021/02166; H04R 3/005
See application file for complete search history.

(56) References Cited

U.S. PATENT DOCUMENTS

2009/0110207 A1* 4/2009 Nakatani .................. 381/66

OTHER PUBLICATIONS

Yoshioka et al., "Enhancement of noisy reverberant speech by linear filtering followed by nonlinear noise suppression." methods 4 (2008): 5. (Year: 2008).*

* cited by examiner

*Primary Examiner* — Sonia L Gay
(74) *Attorney, Agent, or Firm* — Cantor Colburn LLP

(57) ABSTRACT

Provided is a method for beamforming by using maximum likelihood estimation in a speech recognition apparatus, including: (a) receiving an input signal ($X_{n,k}$) at a time frame n and a frequency k where noise is mixed: (b) determining a probability density function for a target signal ($Y_{n,k}$) obtained by removing the noise from the input signal satisfies a complex generalized Guassian distribution or a complex gamma distribution where an average value is zero in a time-frequency domain; (c) estimating a variance ($\lambda_{n,k}$) of the target signal so as to maximize log likelihood for the probability density function; (d) estimating a filter ($w_k$) maximizing a cost function so as to maximize the log likelihood for the probability density function; and (e) repeatedly performing the estimation of the steps (c) and (d) until the filter ($w_k$) coverages, and finally acquiring a final filter ($w_k$).

9 Claims, 2 Drawing Sheets

(51) Int. Cl.
*G10L 21/0216* (2013.01)
*G10L 15/00* (2013.01)
*H04R 3/00* (2006.01)

FIG. 2

UNIT: WORD RECOGNITION ERROR RATE (%)

| SNR(dB) | Baseline | MVDR | MPDR | Proposed |
|---|---|---|---|---|
| 0 | 85.65 | 50.44 | 51.91 | 40.09 |
| 5 | 72.91 | 38.18 | 37.79 | 29.88 |
| 10 | 58.23 | 28.03 | 27.81 | 22.41 |
| 15 | 42.90 | 20.11 | 20.40 | 18.56 |
| 20 | 30.49 | 17.25 | 17.14 | 16.76 |
| ∞ | 19.71 | 15.95 | 15.83 | 16.39 |

METHOD FOR BEAMFORMING BY USING MAXIMUM LIKELIHOOD ESTIMATION FOR A SPEECH RECOGNITION APPARATUS

BACKGROUND OF THE INVENTION

1. Field of the Invention

The present invention relates to a method for beamforming by using maximum likelihood estimation in a speech recognition apparatus, and more particularly, to a beamforming method for estimating a filter that maximizes log likelihood of a probability density function under an assumption that a beamforming output signal using multiple microphones satisfies a complex generalized Gaussian distribution or a complex gamma distribution with respect to sound signals of which distortion is generated by noise in the speech recognition apparatus.

2. Description of the Related Art

In a sound signal recorded in a general indoor environment, distortion of the sound signal is generated by noise, and thus, sound quality is lowered, and performance of speech recognition is deteriorated. In order to overcome this problem, the noise has been removed by using a technique of estimating a filter in the direction of minimizing beamforming output signal by using multiple microphones.

One of these filter estimation techniques is an MVDR (minimum variance distortionless response) beamforming algorithm. Hereinafter, the MVDR beamforming algorithm will be described in brief.

An input signal (X) obtained with M microphones in a time-frequency domain through short-time Fourier transform can be expressed by the following equation.

$$X_{n,k} = H_k^1 S_{n,k} + \Sigma_{i=2}^N H_k^i N_{n,k}^i \quad \text{[Equation 1]}$$

Herein, $X_{n,k}$, $S_{n,k}$, $N_{n,k}$, and $H_k$ indicate M-dimensional vectors configured with a microphone input signal in a time frame n and a frequency k, a sound signal, a noise signal, and an (M×N)-dimensional matrix configured with spatial filters applied according to sound and noise signals, respectively. $H_k^i$ indicates a spatial filter from a sound source to a microphone.

The target signal $(Y_{n,k})$ in which the noise is removed from the input signal can be expressed by the following equation in order to remove noise components that have a major influence on sound quality or speech recognition performance so as to be deteriorated.

$$Y_{n,k} = w_k^H X_{n,k} \quad \text{[Equation 2]}$$

The object of the beamforming is to minimize the output power obtained by filtering the noise signal $(N_{n,k})$ received through the spatial filter and to fix the gain of the direction of the target sound source to 1 as expressed by Equation 3.

$$w_k^H a_k = 1 \quad \text{[Equation 3]}$$

Herein, $w_k$ indicates the filter that maximizes the cost function, $a_k$ indicates the steering vector, and the superscript H indicates the Hermitian of the matrix.

In a case where $L_k$, d, c, and $F_s$ indicate the number of total frequency bins, the distance between the sound source and the microphone, the speed of sound, and the sampling frequency, respectively, the steering vector $a_k$ can be expressed by Equation 4. The $L_k$ indicates the number of DFT points of a discrete Fourier transform.

$$a_k = \exp\left(-2\pi \frac{(k-1)}{L_k} \frac{d}{c} F_s\right) \quad \text{[Equation 4]}$$

The cost function satisfying the condition by using a Lagrange multiplier is expressed by the following equation.

$$J_k = w_k^H \Sigma_{n=i}^d N_{n,k} N_{n,k}^H w_k + \alpha(w_k^H a - 1) = w_k^H R_k^N w_k + \alpha(w_k^H a_k - 1) \quad \text{[Equation 5]}$$

At this time, the filter $(w_k)$ that maximizes the cost function is expressed by the following equation. Herein, $R_k$ indicates a covariance matrix for an input signal $X_{n,k}$ at a frame n and a frequency k, and $R_k^N$ indicates a covariance matrix for the noise component $N_{n,k}$ of the input signal.

$$w_k = \frac{R_k^{N-1} a_k}{a_k^H R_k^{N-1} a_k} \quad \text{[Equation 6]}$$

The above-mentioned MVDR algorithm can estimate the noise signal $(N_{n,k})$ when no target sound exists and only noise exists. However, it is difficult to estimate the noise signal in a section where a target sound exists.

In the present invention, instead of estimating the filter that minimizes the beamforming output signal in the related art, there is proposed an algorithm for estimating a filter in which log likelihood of the probability density function is maximized under an assumption that a beamforming output signal satisfies a complex generalized Gaussian distribution,

SUMMARY OF THE INVENTION

The present invention is to provide a beamforming method for estimating a filter such that log likelihood of a probability distribution function is maximized under the assumption that a beamforming output signal of a speech recognition apparatus satisfies a complex generalized Gaussian distribution.

According to an aspect of the present invention, there is provided method for beamforming by using maximum likelihood estimation, the method executed by a processor of a speech recognition apparatus, the method including steps of: (a) receiving, from a microphone of the speech recognition apparatus, an input signal $(X_{n,k})$ in which noise at a time frame n and a frequency k is mixed; (b) determining a probability density function $(p_{CDB}(Y_{n,k}))$ for a target signal $(Y_{n,k})$ under an assumption that the target signal $(Y_{n,k})$ obtained by removing the noise from the input signal satisfies a complex generalized Gaussian distribution or a complex gamma distribution in which an average value is zero in a time-frequency domain; (c) estimating a variance $(\lambda_{n,k})$ of the target signal so as to maximize log likelihood for the probability density function; (d) estimating a filter $(w_k)$ maximizing a cost function so as to maximize the log likelihood for the probability density function; and (e) repeatedly performing the estimation of the steps (c) and (d) until the filter $(w_k)$ converges, and finally acquiring a final filter $(w_k)$.

In the method for beamforming by using maximum likelihood estimation according to the above aspect, it is preferable that the filter $(w_k)$ is a filter for obtaining the target signal $(Y_{n,k})$ from the input signal $(X_{n,k})$ expressed by the following equation.

$$Y_{n,k} = w_k^H X_{n,k}$$

In the method for beamforming by using maximum likelihood estimation according to the above aspect, the probability density function ($p_{CGG}(Y_{n,k})$) in the step (b) is expressed by the following equation, $$p_{CGG}(Y_{n,k}) = \frac{\alpha}{\lambda_{n,k}} \exp\left\{-\left[\frac{Y_{n,k}Y_{n,k}^*}{\lambda_{n,k}}\right]^c\right\}.$$

herein, $\alpha$ is a constant that allows $p_{CGG}(Y_{n,k})$ to be the probability density function, and c is a shape parameter of a Gaussian distribution, c=1 indicates the complex Gaussian distribution, c<1 indicates a distribution that is more sparse than the Gaussian distribution, and c>1 indicates a distribution that is less sparse than the Gaussian distribution.

In the method for beamforming by using maximum likelihood estimation according to the above aspect, the probability density function ($p_{CGG}(Y_{n,k})$) in the step (b) is expressed by the following equation, $$p_{CG}(Y_{n,k}) = \frac{1}{\Gamma(\alpha)\beta^\alpha} Y_{n,k}^{\alpha-1} e^{-Y_{n,k}/\beta}$$

herein, $\alpha$ is a complex constant satisfying $|\alpha|>0$, and $\beta$ is a positive real number.

In the method for beamforming by using maximum likelihood estimation according to the above aspect, it is preferable that, in the step (c) and the step (d), the filter and the variance are estimated by maximizing the log likelihood satisfying a constraint condition of $w_k^H a_k=1$ (herein, $a_k$ is a steering vector).

In the method for beamforming by using maximum likelihood estimation according to the above aspect, it is preferable that the variance ($\lambda_{n,k}$) is obtained by using an average value for neighboring frames including $Y_{n,k}Y'_{n,k}$, and if necessary for initialization, the variance is obtained by using $Y_{n,k}Y'_{n,k}$ obtained through MVDR beamforming or MPDR beamforming.

In the beamforming method according to the present invention, under the assumption that the sound signal, where the noise is removed, as the target signal satisfies the complex generalized Gaussian distribution, the filter and the variance for the target signal is estimated such that the log likelihood is maximized.

Therefore, in the beamforming method according to the present invention, the word recognition error rate is lower than those of the beamforming methods in the related art.

BRIEF DESCRIPTION OF THE DRAWINGS

FIG. 2 is a result table illustrating word recognition error rates measured by using the method for beamforming by using maximum likelihood estimation according to an embodiment of the present invention and a method in the related art.

DETAILED DESCRIPTION OF THE EMBODIMENTS

Figure 1:
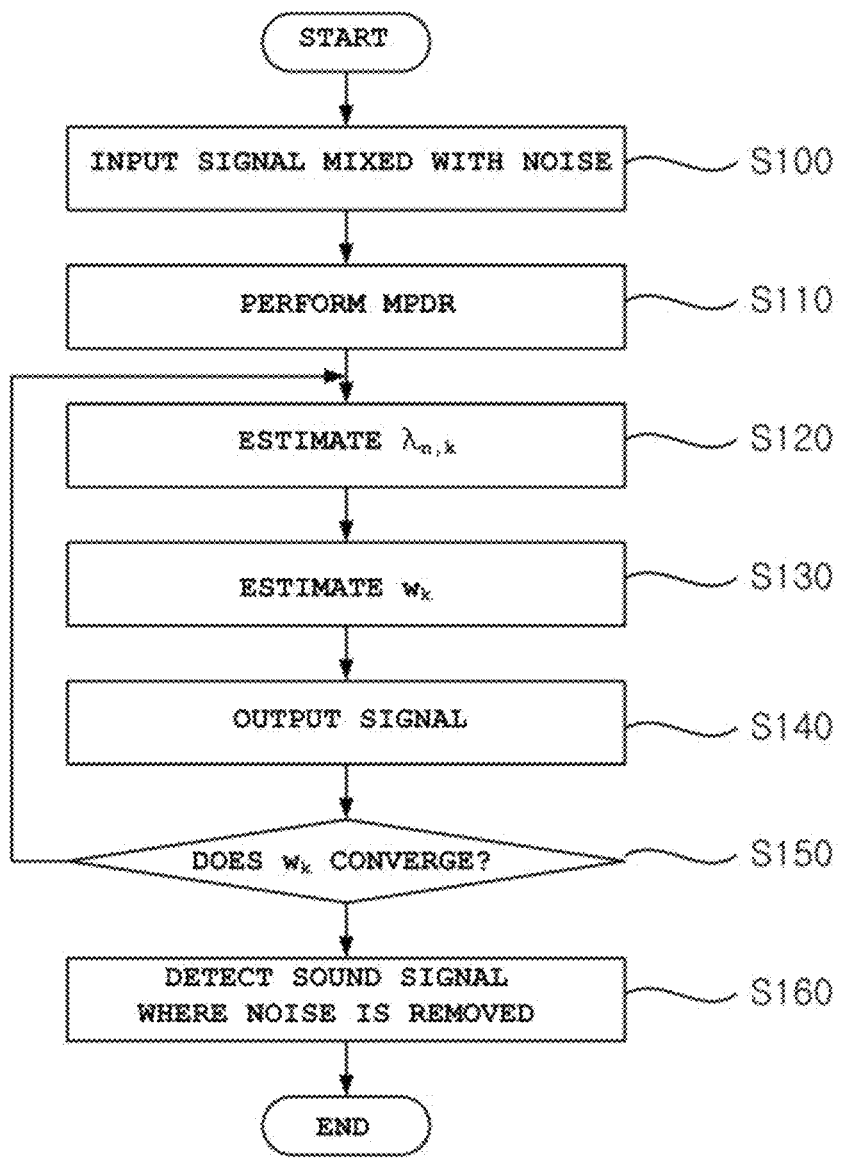
FIG. 1 is a flowchart illustrating a method for beamforming by using maximum likelihood estimation according to an embodiment of the present invention.

Hereinafter, a method for beamforming by using maximum likelihood estimation in a speech recognition apparatus according to an embodiment of the present invention will be described in detail with reference to the accompanying drawings.

FIG. 1 is a flowchart illustrating the method for beamforming by using maximum likelihood estimation according to the embodiment of the present invention.

In the MVDR algorithm described above, it is possible to estimate the noise signal when there is no target speech and there is only noise, but it is difficult to accurately estimate the noise signal in the section where the target sound exists. Referring to FIG. 1, in the beamforming method according to the embodiment of the present invention, if a signal mixed with noise is input (step 100), a cost function ($J_k$) is set as expressed by. Equation 7 so as to minimize an output power of the input signal instead of minimizing an output power of a noise signal by using a minimum power distortionless response (MPDR) (step 110).

$$J_k = w_k^H \Sigma_{n=1}^{L_k} X_{n,k} X_{n,k}^H w_k + \alpha(w_k^H a - 1) = w_k^H R_k w_k + \alpha(w_k^H a_k - 1)$$ [Equation 7]

Herein, $L_n$ indicates the total number of frames.

The filter ($w_k$) that maximizes the cost function by such an MVDR method is expressed by Equation 8.

$$w_k = \frac{R_k^{-1} a_k}{a_k^H R_k^{-1} a_k}$$ [Equation 8]

If $R_k$ is close to a singular matrix, the inverse matrix cannot be estimated correctly, so that the filter is estimated after a small value is added to the diagonal portion of the matrix, and the finally estimated filter is expressed by Equation 9.

$$w_k = \frac{(R_k + \delta I)^{-1} a_k}{a_k^H (R_k + \delta I)^{-1} a_k}$$ [Equation 9]

Herein, $\delta$ indicates a small constant that prevents the covariance from becoming a singular matrix, and $R_k$ indicates a covariance matrix of input signals $X_{n,k}$ at a frame n and a frequency k.

In the MPDR beamforming algorithm described above, the filter is estimated so as to minimize the power of beamforming output signal in the time-frequency domain through short-time Fourier transform. However, due to a difference between the covariance of the noise signal and the covariance of the input signal, the noise is not likely to be removed.

Therefore, in the beamforming method according to the present invention, under the assumption that the sound signal where the noise is removed by using the maximum likelihood based beamforming algorithm using the complex Gaussian distribution satisfies the Gaussian distribution, the noise is removed such that the log likelihood of the distribution is maximized. Under the assumption that $Y_{n,k}$ satisfies the complex generalized Gaussian distribution where the average value is zero in the time-frequency domain, the probability density function of $Y_{n,k}$ is expressed by the following Equation 10.

$$p_{CGG}(Y_{n,k}) = \frac{\alpha}{\lambda_{n,k}} \exp\left\{-\left[\frac{Y_{n,k}Y_{n,k}^*}{\lambda_{n,k}}\right]^c\right\}.$$ [Equation 10]

Herein, α is a constant that allows $p_{CGG}(Y_{n,k})$ to be the probability density function, and c is a shape parameter of a Gaussian distribution, c=1 indicates the complex Gaussian distribution, c<1 indicates a distribution that is more sparse than the Gaussian distribution, and c>1 indicates a distribution that is less sparse than the Gaussian distribution. $\lambda_{n,k}$ indicates the variance of $Y_{n,k}$.

On the other hand, the present invention can be applied to various distribution functions that can represent sparse distribution such as the complex gamma distribution as expressed by Equation 11.

$$p_{CG}(Y_{n,k}) = \frac{1}{\Gamma(\alpha)\beta^{\alpha}} Y_{n,k}^{\alpha-1} e^{-Y_{n,k}/\beta} \quad \text{[Equation 11]}$$

Herein, α is a complex constant satisfying |α|>0, and β is a positive real number.

The log likelihood satisfying the constraint condition of $w_k^H a_k = 1$ is maximized in order to estimate the filter $w_k$ and the variance $\Lambda_{n,k}$ through the maximum likelihood method. The log likelihood function is expressed by Equation 12.

$$l(w_k, \lambda_{n,k}) = \sum_{n=1}^{L_n} \left\{ \log\alpha - \log(\lambda_{n,k}) - \left[\frac{Y_{n,k} Y_{n,k}^*}{\lambda_{n,k}}\right]^c \right\} + \alpha(w_k^H a_k - 1)$$

$$= \sum_{n=1}^{L_n} \left\{ \log\alpha - \log(\lambda_{n,k}) - \left[\frac{w_k^H X_{n,k} X_{n,k}^H w_k}{\lambda_{n,k}}\right]^c \right\} + \alpha(w_k^H a_k - 1) \quad \text{[Equation 12]}$$

The variance $\lambda_{n,k}$ maximizing the log likelihood can be obtained as expressed by Equations 13 and 14 (step 120).

$$\frac{\partial l(w_k, \lambda_{n,k})}{\partial \lambda_{n,k}} = -\frac{1}{\lambda_{n,k}} + c\frac{[Y_{n,k} Y_{n,k}^*]^c}{\lambda_{n,k}^{c+1}} = 0. \quad \text{[Equation 13]}$$

$$\lambda_{n,k} = c^{1/c} Y_{n,k} Y_{n,k}^* \quad \text{[Equation 14]}$$

In order to improve the reliability of the estimated variance $\lambda_{n,k}$ an average value for neighboring frames including $Y_{n,k} Y_{n,k}^*$ is used as the value of the variance $\lambda_{n,k}$, as expressed by Equation 15.

$$\lambda_{n,k} = \frac{1}{2r+1} \sum_{l=n-r}^{n+r} Y_{l,k} Y_{l,k}^* \quad \text{[Equation 15]}$$

First, since the value of $Y_{n,k}$ cannot be known, the variance $\Lambda_{n,k}$ is initialized using a filter wk that maximizes the output power of the existing the input signal.

A filter $w_k$ that maximizes the log likelihood in a similar manner can be obtained by Equations 16 and 17 (step 130).

$$\frac{\partial l(w_k, \lambda_{n,k})}{\partial w_k^*} = -c \sum_{n=1}^{L_n} \left[\frac{Y_{n,k} Y_{n,k}^*}{\lambda_{n,k}}\right]^{c-1} \left(\frac{X_{n,k} X_{n,k}^H}{\lambda_{n,k}}\right) w_k + \alpha a_k = P_k w_k + \alpha a_k = 0 \quad \text{[Equation 16]}$$

$$w_k = \frac{(P_k + \delta I)^{-1} a_k}{a_k^H (P_k + \delta I)^{-1} a_k} \quad \text{[Equation 17]}$$

$$P_k = -c \sum_{n=1}^{L_n} \left[\frac{Y_{n,k} Y_{n,k}^*}{\lambda_{n,k}}\right]^{c-1} \left(\frac{X_{n,k} X_{n,k}^H}{\lambda_{n,k}}\right).$$

Herein, $P_k$ is a covariance matrix applied with weighting factors calculated from the likelihood based on the complex generalized Gaussian distribution.

The final filter $w_k$ is obtained by repeatedly estimating $\lambda_{n,k}$ and $w_k$ (step 150), and the sound signal from which the noise is removed by using the final filter is detected (step 160).

In order to evaluate the performance of the beamforming method according to the present invention having the above-described configuration, the word recognition error rate was measured by using a Kaldi speech recognition tool. A speech Recognition apparatus performed DNN learning using the recipe used in Reverb Challenge 2014 and re-recorded MC-WSJ-AV in real environment and mixed with noise according to signal-to-nose ratios (SNRs). The MVDR algorithm performs covariance estimation by using the frame of a silence interval for noise estimation. The number of repetition times used in the maximum likelihood based beamforming algorithm is 7, and the value is 2.

FIG. 2 is a result table illustrating word recognition error rates measured by using the method for beamforming by using maximum likelihood estimation according to an embodiment of the present invention and a method in the related art. Referring to FIG. 2, it can be understood that, in a case where there is no noise, the beamforming method proposed by the present invention achieves a similar level as compared with the MVDR beamforming in the related art; and in a case where there is a noise, the word recognition error rate in the beamforming method proposed by the present invention is low. Therefore, it can be understood that the beamforming method according to the present invention can be used as a pretreatment method which is more robust in a noisy environment.

The above-described method for beamforming by using maximum likelihood estimation according to the present invention can be implemented by a program and executed by a processor of a speech recognition apparatus. The present invention also includes a non-transitory computer-readable recording medium on which a program implementing the above-described method for beamforming by using maximum likelihood estimation is recorded.

While the present invention has been particularly illustrated and described with reference to exemplary embodiments thereof, it should be understood by the skilled in the art that the invention is not limited to the disclosed embodiments, and various modifications and applications not illustrated in the above description can be made without departing from the spirit of the invention. In addition, differences relating to the modifications and applications should be construed as being included within the scope of the invention as set forth in the appended claims.

What is claimed is:

1. A method for beamforming by using maximum likelihood estimation, the method executed by a processor of a speech recognition apparatus, the method comprising steps of:

(a) receiving, from a microphone of the speech recognition apparatus, an input signal ($X_{n,k}$) at a time frame n and a frequency k in which noise is mixed;

(b) determining a probability density function ($P_{CGG}(Y_{n,k})$) for a target signal ($Y_{n,k}$) under an assumption that the target signal ($Y_{n,k}$) obtained by removing the noise from the input signal satisfies a complex generalized Gaussian distribution or a complex gamma distribution in which an average value is zero in a time-frequency domain;

(c) estimating a variance ($\lambda_{n,k}$) of the target signal so as to maximize log likelihood for the probability density function;

(d) estimating a filter ($w_k$) maximizing a cost function so as to maximize the log likelihood for the probability density function; and (e) repeatedly performing the estimation of the steps (c) and (d) until the filter ($w_k$) converges, and finally acquiring a final filter ($w_k$), wherein, in the step (c) and the step (d), the filter and the variance are estimated by maximizing the log likelihood satisfying a constraint condition including a steering vector $a_k$.

2. The method according to claim 1, wherein the filter ($w_k$) is a filter for obtaining the target signal ($Y_{n,k}$) from the input signal ($X_{n,k}$) expressed by the following equation $$Y_{n,k} = w_k^H X_{n,k}.$$

3. The method according to claim 1, wherein the probability density function) ($P_{CGG}(Y_{n,k})$) in the step (b) is expressed by the following equation, $$p_{CGG}(Y_{n,k}) = \frac{\alpha}{\lambda_{n,k}} \exp\left\{-\left[\frac{Y_{n,k} Y_{n,k}^*}{\lambda_{n,k}}\right]^c\right\}.$$

herein, $\alpha$ is a constant that allows $P_{CGG}(Y_{n,k})$ to be the probability density function, and c is a shape parameter of a Gaussian distribution, c=1 indicates the complex Gaussian distribution, c<1 indicates a distribution that is more sparse than the Gaussian distribution, and c>1 indicates a distribution that is less sparse than the Gaussian distribution.

4. The method according to claim 1, wherein the probability density function) ($P_{CGG}(Y_{n,k})$) in the step (b) is expressed by the following equation, $$p_{CG}(Y_{n,k}) = \frac{1}{\Gamma(\alpha)\beta^\alpha} Y_{n,k}^{\alpha-1} e^{-Y_{n,k}/\beta}$$

herein, $\alpha$ is a complex constant satisfying $|\alpha|>0$, and $\beta$ is a positive real number.

5. The method according to claim 1, wherein, the constraint condition including the steering vector is $w_k^H a_k = 1$.

6. The method according to claim 1, wherein the variance ($\lambda_{n,k}$) is obtained by using an average value for neighboring frames including $Y_{n,k} Y'_{n,k}$, and if necessary for initialization, the variance is obtained by using $Y_{n,k} Y'_{n,k}$ obtained through MVDR beamforming or MPDR beamforming.

7. A non-transitory computer-readable storage device having a program for implementing the method for beamforming by using maximum likelihood estimation according to claim 1 so as to be executed by a processor of the speech recognition apparatus.

8. A method for beamforming by using maximum likelihood estimation, the method executed by a processor of a speech recognition apparatus, the method comprising steps of:

(a) receiving, from a microphone of the speech recognition apparatus, an input signal ($X_{n,k}$) at a time frame n and a frequency k in which noise is mixed;

(b) determining a probability density function ($P_{CGG}(Y_{n,k})$) for a target signal ($Y_{n,k}$) under an assumption that the target signal ($Y_{n,k}$) obtained by removing the noise from the input signal satisfies a complex generalized Gaussian distribution or a complex gamma distribution in which an average value is zero in a time-frequency domain;

(c) estimating a variance ($\lambda_{n,k}$) of the target signal so as to maximize log likelihood for the probability density function;

(d) estimating a filter ($w_k$) maximizing a cost function so as to maximize the log likelihood for the probability density function; and (e) repeatedly performing the estimation of the steps (c) and (d) until the filter ($w_k$) converges, and finally acquiring a final filter ($w_k$), wherein the probability density function ($P_{CGG}(Y_{n,k})$) in the step (b) is expressed by the following equation, $$p_{CG}(Y_{n,k}) = \frac{1}{\Gamma(\alpha)\beta^\alpha} Y_{n,k}^{\alpha-1} e^{-Y_{n,k}/\beta}$$

herein, $\alpha$ is a complex constant satisfying $|\alpha|>0$, and $\beta$ is a positive real number.

9. A method for beamforming by using maximum likelihood estimation, the method executed by a processor of a speech recognition apparatus, the method comprising steps of:

(a) receiving, from a microphone of the speech recognition apparatus, an input signal ($X_{n,k}$) at a time frame n and a frequency k in which noise is mixed;

(b) determining a probability density function ($P_{CGG}(Y_{n,k})$) for a target signal ($Y_{n,k}$) under an assumption that the target signal ($Y_{n,k}$) obtained by removing the noise from the input signal satisfies a complex generalized Gaussian distribution or a complex gamma distribution in which an average value is zero in a time-frequency domain;

(c) estimating a variance ($\lambda_{n,k}$) of the target signal so as to maximize log likelihood for the probability density function;

(d) estimating a filter ($w_k$) maximizing a cost function so as to maximize the log likelihood for the probability density function; and (e) repeatedly performing the estimation of the steps (c) and (d) until the filter ($w_k$) converges, and finally acquiring a final filter ($w_k$), wherein the variance ($\lambda_{n,k}$) is obtained by using an average value for neighboring frames including $Y_{n,k} Y'_{n,k}$, and if necessary for initialization, the variance is obtained by using $Y_{n,k} Y'_{n,k}$ obtained through MVDR beamforming or MPDR beamforming.

* * * * *